H. H. HARRIS.
MOLDING MACHINE.
APPLICATION FILED NOV. 28, 1908.
938,321.
Patented Oct. 26, 1909.
3 SHEETS—SHEET 1.
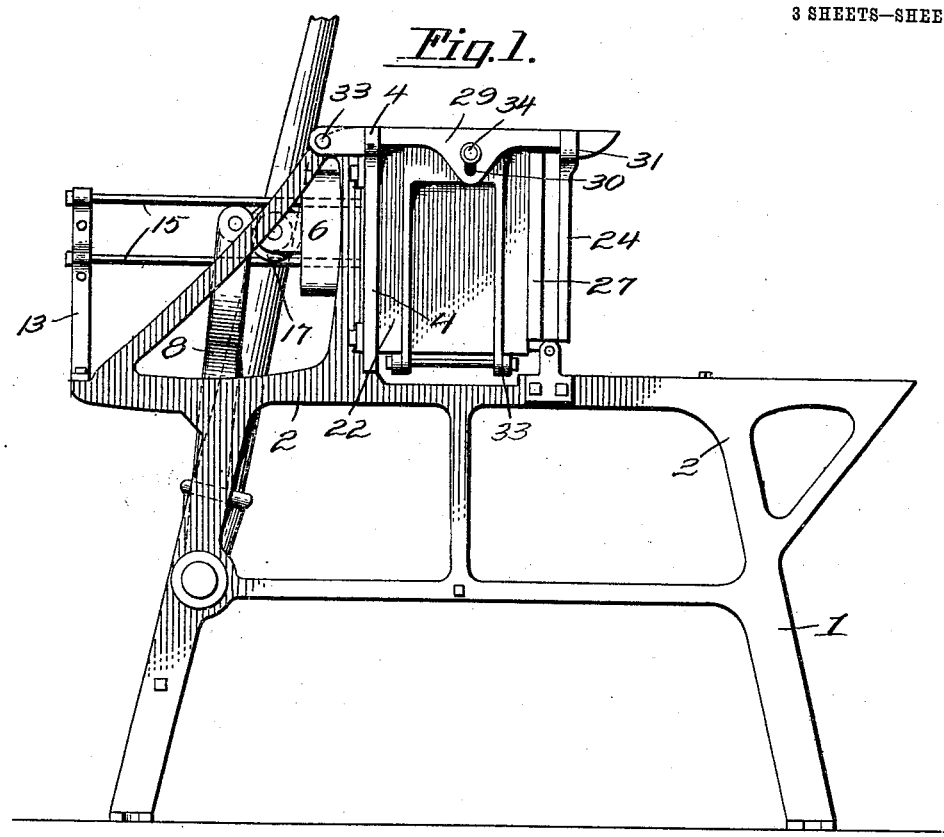
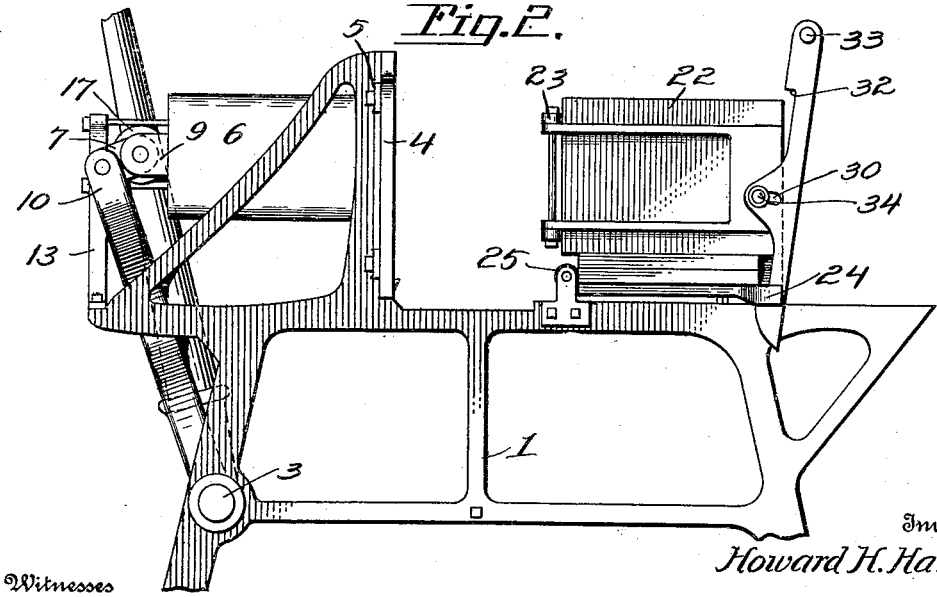
Witnesses
F. C. Gibson.
Inventor
Howard H. Harris.
By Victor J. Evans
Attorney H. H. HARRIS.
MOLDING MACHINE.
APPLICATION FILED NOV. 28, 1908.
938,321.
Patented Oct. 26, 1909.
3 SHEETS—SHEET 2.
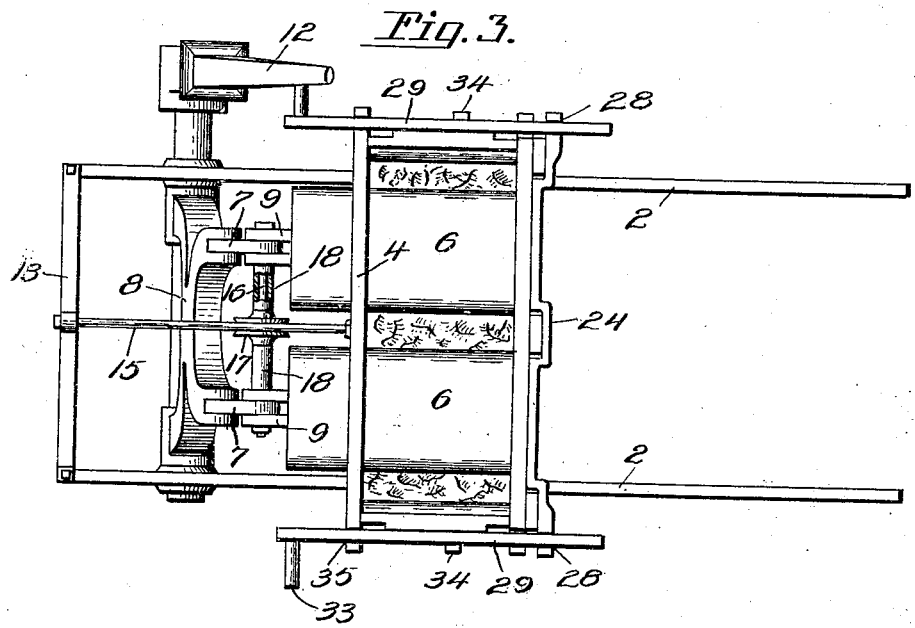
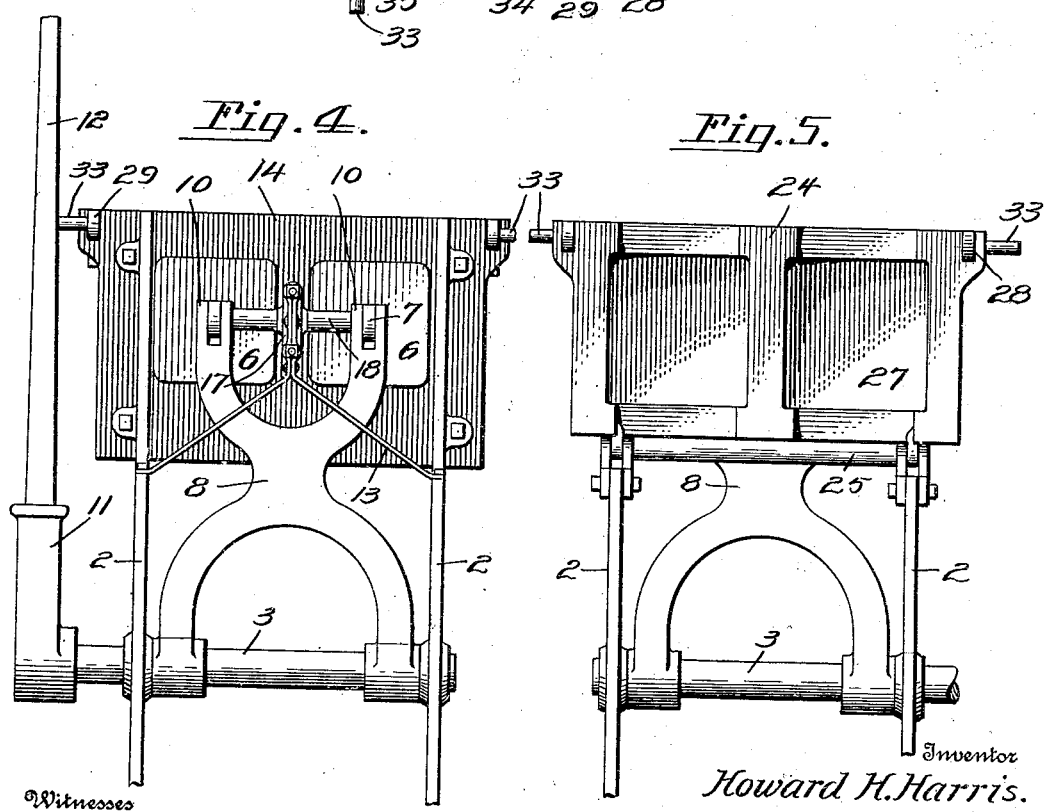
Witnesses
F. C. Gibson.
Inventor
Howard H. Harris.
By Victor J. Evans
Attorney H. H. HARRIS.
MOLDING MACHINE.
APPLICATION FILED NOV. 28, 1908.
938,321.
Patented Oct. 26, 1909.
3 SHEETS—SHEET 3.
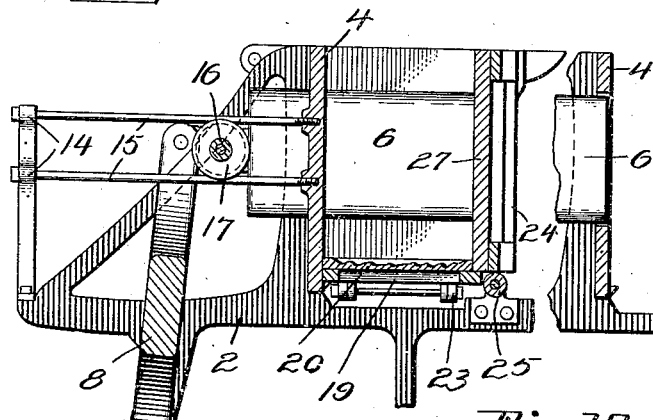
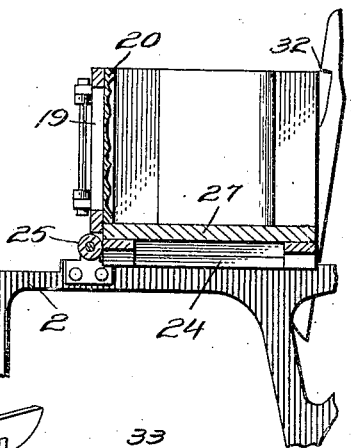
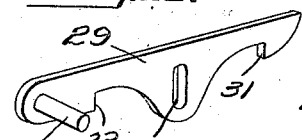
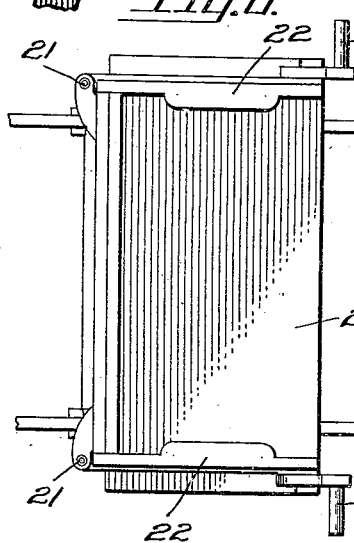
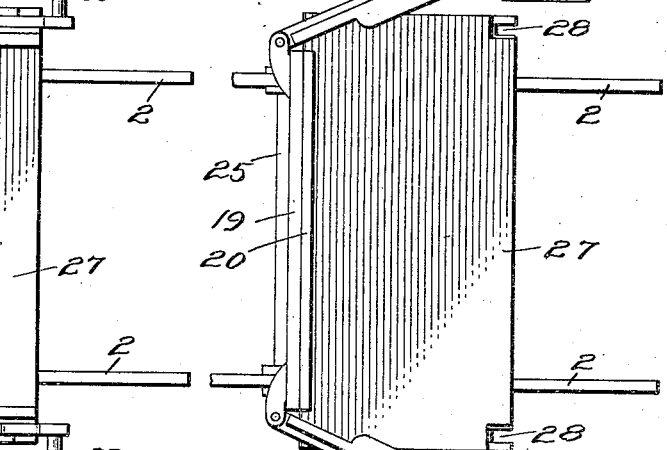
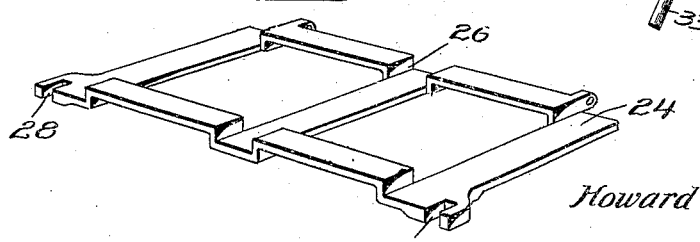
Witnesses
F. C. Gibson
Inventor
Howard H Harris.
By Victor J. Evans
Attorney

UNITED STATES PATENT OFFICE.

HOWARD H. HARRIS, OF ANDERSON, INDIANA.

MOLDING-MACHINE.

938,321.   Specification of Letters Patent.   Patented Oct. 26, 1909.

Application filed November 28, 1908.   Serial No. 464,909.

*To all whom it may concern:*

Be it known that I, HOWARD H. HARRIS, a citizen of the United States of America, residing at Anderson, in the county of Madison and State of Indiana, have invented new and useful Improvements in Molding-Machines, of which the following is a specification.

This invention relates to molding machines, and one of the principal objects of the invention is to provide reliable and efficient means for quickly opening and closing the mold box and withdrawing the molded article therefrom.

Another object of the invention is to provide a molding machine for molding hollow building blocks in which a sliding core is used, means being provided for quickly withdrawing the core from the mold box, means being also provided for quickly opening the box, withdrawing the molded article and closing the box as a continuous operation.

These and other objects may be attained by means of the construction illustrated in the accompanying drawings, in which,—

Figure 1 is a side elevation of a molding machine made in accordance with my invention, the mold box being shown closed and the cores being projected into the box. Fig. 2 is a similar view, showing the cores withdrawn and the mold box disposed upon its side. Fig. 3 is a top plan view of the machine when in condition to receive the molding material. Fig. 4 is a rear elevation of the same. Fig. 5 is a front elevation of the same. Fig. 6 is a longitudinal sectional view of the mold box and adjacent parts. Fig. 7 is a detail longitudinal sectional view, showing the mold box disposed upon its side. Fig. 8 is a plan view of the mold box closed, with the pallet rack removed. Fig. 9 is a similar view, showing the mold box open. Fig. 10 is a detail perspective view of the latch for holding the hinged parts of the mold box together. Fig. 11 is a detail perspective view of the pallet rack.

Referring to the drawings, the numeral 1 designates a suitable supporting frame for the machine, said frame comprising the side members 2 connected together by means of a shaft 3 and by means of a core plate 4 which is bolted to the upright portion 5 of the frame. The cores 6 are connected by means of links 7 to a double yoke 8. The links 7 are pivoted between spaced lugs 9 formed upon or secured to the rear ends of the cores 6, and the links 7 are pivoted between spaced lugs 10 formed on the upper ends of the double yoke 8. The lower spaced arms of the yoke 8 are rigidly connected to the shaft 3, and said shaft is journaled at its ends in the frame of the machine. On one end of the shaft 3 is a lever socket 11 in which a lever 12 is fitted.

A bracket 13 supported at its ends upon the side members 2 of the frame is provided at its upper end with bent portions 14 in which are secured the outer ends of guide rods 15, the inner ends of said guide rods being secured in threaded openings in the core plate 4, said guide rods being thus supported in horizontal position. A transverse shaft 16 extends across and through the lugs 9 and through the links 7, said shaft carrying a centrally disposed grooved roller 17 which is held in central position upon the shaft by means of sleeves 18. The roller 17 is disposed between the guide rods 15. The core plate 4 is provided with openings through which the cores 6 extend, and as the lever 12 is operated the cores are moved into the mold box or withdrawn therefrom in a truly horizontal direction, owing to the roller 17 and the guide rods 15.

The mold box comprises the bottom 19 upon which the face mold 20 is supported, said bottom being hinged at 21 and the side members 22 hinged at 23. A pallet rack 24 hinged at 25 is provided with offset portions 26, and a pallet board 27 is supported upon said rack, said pallet board forming one member of the mold box. The pallet rack is provided with oppositely disposed notches 28.

A latch 29 provided with a slot 30 near the center thereof has near its ends shoulders 31, 32 and an outwardly projecting handle 33. Connected to each end member 22 is one of these latches, said latches being connected to said members by means of a stud 34 extending through the slot 30, thus permitting the latches to be rocked upon said stud or to be moved bodily upward. The front shoulder 31 is adapted to engage the notches 28 in the pallet rack, while the shoulder 32 engages a similar notch 35 in the core plate 4.

The operation of my invention may be briefly described as follows:—The mold box being closed, as shown in Fig. 1, and the cores occupying their positions in the box, as shown in said figure, the plastic material is poured into the box and properly tamped.

The operator then withdraws the cores by operating the lever 12; then he grasps the handles 33 and raises the shoulder 32 out of engagement with the notches 35 in the core plate and swings the box upon the hinge 25 to the position shown in Fig. 2. Still holding the handles 33 the latches 29 are manipulated to release the shoulders 31 from the notches 28 in the pallet rack, and the side members 22 are then opened out, as shown in Fig. 9 and shaped back to their original position. The molded block then rests upon the pallet block 27 ready to be removed, and the operator of the machine may still retain his hold upon the handles 33 until the pallet rack is connected with the latches and the latches connected with the core plate, thus depressing the mold box in position to receive the molding material for another block after the cores 6 have been projected into the box.

From the foregoing it will be obvious that a machine made in accordance with my invention is quick in operation, that the mold box parts are moved continuously from the molding position to the releasing position for withdrawal of the molded articles and back again to the molding position without releasing the hands from the latches. In the molding of this class of articles time is an element, and by means of the latching devices for the mold box and their method of operation considerable time is saved in the molding of blocks, and thus this feature of my invention is of material value. Moreover, the manner in which the cores are operated to move smoothly in and out and to be guided in their movements by the guide rods and grooved roller is a feature of considerable importance in a machine of this character. It will be obvious that several cores can be used instead of the two shown, and that the face plate may be changed to suit the character of the work to be done.

I claim:—

1. In a molding machine, a mold box comprising a core plate, a core mounted to move through said core plate into the mold box, a bottom for supporting a face plate, a pallet rack hinged to the frame, sides independently hinged to the bottom, latches connected to said sides, said latches each being provided with a shoulder, a handle and a slot through which latter the latch is pivoted to the side member, said core plate and pallet rack being provided with notches for engagement of said shoulders.

2. In a molding machine, a mold box, the sides, the back and front of which are hinged at their lower edges, and means for opening and closing said mold box, said means comprising latches pivotally mounted upon the side members of the box, said latches each having oppositely disposed shoulders near their opposite ends, a handle projecting laterally from each latch, the front and back of the box being provided with slots and shoulders to be engaged by the shoulders on the latches for holding the box closed.

3. In a molding machine, a core plate, cores mounted to move through said plate into the mold box, links pivotally connected to said cores, a yoke connected to said links, a shaft to which said yoke is fixed, a lever for rocking said shaft, a grooved roller connected to the cores, guide rods arranged in vertical alinement, said rods being secured at one end to the core plate, and a bracket to which the outer ends of said rods are connected, said roller mounted to run between said guide rods.

In testimony whereof I affix my signature in presence of two witnesses.

HOWARD H. HARRIS.

Witnesses:
   CHAS. N. FRITCHLEY,
   OTTO DELAPLANE.